Jan. 6, 1942.            D. E. BENCH ET AL            2,269,332
SYNCHRONIZING AIRPLANE ENGINES
Filed Feb. 23, 1939

Inventor
DAVID E. BENCH
& MELVIN A. CROSBY
By Toulmin & Toulmin
Attorneys

Patented Jan. 6, 1942

2,269,332

UNITED STATES PATENT OFFICE 2,269,332

SYNCHRONIZING AIRPLANE ENGINES

David E. Bench and Melvin A. Crosby, Dayton, Ohio, assignors to The Hydraulic Development Corp. Inc., Wilmington, Del., a corporation of Delaware Application February 23, 1939, Serial No. 257,990

7 Claims. (Cl. 60—97)

This invention relates to apparatus for synchronizing airplane engines although it will be apparent that it may be applied to the synchronization of multiple prime movers of any type. However, it is particularly applicable to the synchronization of throttle controlled combustion engines such as are employed in multi-motored aircraft.

It is an object of the invention to make provision for absolute accurate synchronization of a plurality of airplane engines by means which is relatively simple and which may be constructed in such manner as to be of light weight and which is adapted to be readily installed in airplanes.

It is another object of the invention to devise such a synchronizing apparatus which employs hydraulic means for synchronizing the several airplane engines.

It is another object of the invention to provide a modification of the main inventive thought wherein the only connections between the several engines to be synchronized are hydraulic. This facilitates installation since it is possible for hydraulic conduits to be readily bent as is necessary to pass from one portion of the airplane to another.

It is another object of the invention to provide a synchronizing means for aircraft engines which employs differential means to control the several engines.

Still another object is to provide a synchronizing mechanism for multiple aircraft engines wherein the manual control for the pilot does not actuate the throttle of any engine directly but acts indirectly through hydraulic and differential means to open the throttles of the several engines simultaneously and in such manner that each engine is perfectly synchronized with each other engine.

Figure 1:
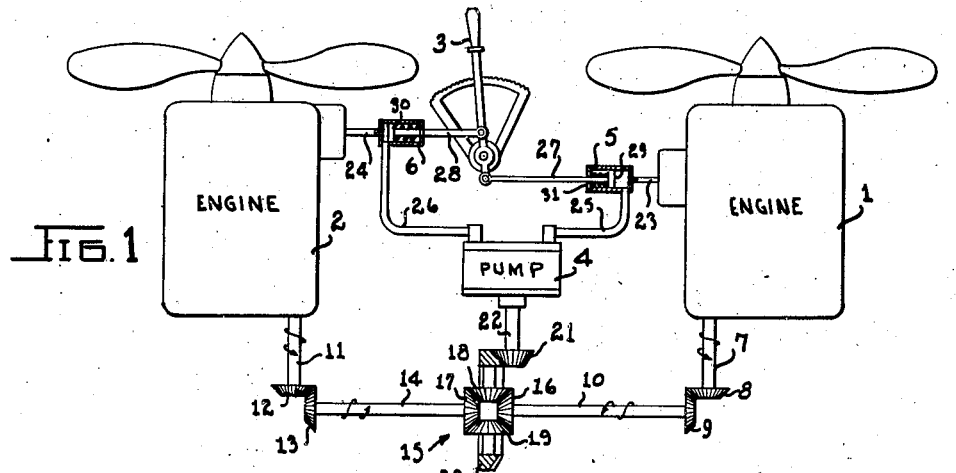
Figure 2:
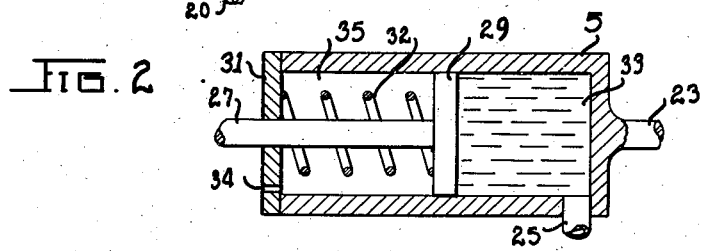
Figure 3:

Referring to the accompanying drawing:

Figure 1 is a diagrammatic representation of one way in which the present invention may be adapted to the synchronization of two airplane engines;

Figure 2 is an enlarged sectional diagrammatical view of throttle controlling means 5 and 6 of Figure 1; and Figure 3 is a diagrammatical view of the application of this invention to the synchronization of three airplane engines. The apparatus of Figure 3 may be employed to synchronize any number of airplane engines or multiple prime movers, whereas apparatus of Figure 1 is particularly adapted to the synchronization of two engines only.

With reference to the accompanying drawing and particularly to Figure 1 thereof, 1 and 2 represent the two airplane engines which are to be operated synchronously one with the other. Engine 1 drives, by a suitable power take-off device, a shaft 7 at a speed which is in direct proportion to the speed of engine 1. Shaft 7 may be conveniently driven by the cam shaft of engine 1. Integrally attached to shaft 7 is a bevel gear 8 which drives bevel gear 9 and associated shaft 10. Shafts 7 and 10 are driven in the directions indicated by the arrows thereon.

Engine 2 drives by a similar power take-off device, a shaft 11. This shaft 11 is conveniently driven from the cam shaft of engine 2 so that it revolves at a speed directly proportional to the speed of engine 2 and at a speed which is related to the speed of engine 2 in the same manner as the speed of shaft 7 is related to the speed of engine 1. Shaft 11 has integrally attached thereto bevel gear 12 which drives bevel gear 13 and associated shaft 14. Shafts 11 and 14 rotate in the directions indicated by the arrows thereon. Consequently shafts 10 and 14 rotate at the same relative speeds with respect to the speeds of engines 1 and 2 respectively.

Shafts 10 and 14 operate a differential device generally designated as 15. Shaft 10 has integrally attached thereto bevel gear 16, while shaft 14 has integrally attached thereto bevel gear 17. Bevel gears 16 and 17 engage spider gears 18 and 19 which are mounted on ring gear 20 in the usual manner. Ring gear 20 drives bevel gear 21 which is integrally attached to shaft 22 which drives pump 4.

23 designates the throttle rod of engine 1 while reference numeral 24 designates the throttle rod of engine 2. Integrally attached to throttle rod 23 is a cylinder 5 and integrally attached to throttle rod 24 is a similar cylinder 6. Cylinder 5 is shown in an enlarged view in Figure 2 and it is to be understood that cylinder 6 is similarly constructed. Connecting the liquid end of cylinder 5 to pump 4 is a liquid conduit 25 and disposed between the liquid end of cylinder 6 and pump 4 is a liquid conduit 26.

In a position accessible to the pilot of the airplane is disposed throttle controlling hand lever 3 which may be set in any desired position to obtain revolution of engines 1 and 2 at the desired speed. After setting hand lever 3 in a given position the synchronizing device will automatically maintain engines 1 and 2 at the desired speed and synchronously one with the other. Throttle controlling lever 3 is conected to intermediate rods 27 and 28. Rod 27 connects throttle lever 3 with the piston 29 in cylinder 5. Rod 28 connects lever 3 with piston 30 in cylinder 6. These rods 27 and 28 are so disposed with reference to the pivot of lever 3 that movement of lever 3 in a given direction functions to operate the throttles of engines 1 and 2 in a similar manner. Thus, if lever 3 is pushed to the right, both rods 27 and 28 draw away from engines 1 and 2 respectively and operate to simultaneously close the throttles of said engines.

Cylinder 5 will now be described and it is to be understood that cylinder 6 is to be constructed in the same manner. Throttle rod 23 of engine 1 is integrally attached to the cylinder portion of cylinder 5 so that relative motion of cylinder 5 with respect to engine 1 moves throttle rod 23 in the same fashion. Disposed within cylinder 5 is a slideable piston 29 which is integrally attached to rod 27 leading from hand lever 3. Disposed between the rear part 31 of the casing of cylinder 5 and piston 29 is a yielding spring 32 which operates to push piston 29 to the right so as to maintain the right hand portion of cylinder 5 filled with liquid at all times. Conduit 25 from pump 4 is in liquid pressure engagement with the liquid chamber 33 of cylinder 5. 34 designates an air vent which allows air displaced from the left hand portion 35 of cylinder 5 to make its exit from the cylinder and likewise allows atmospheric air to enter into chamber 35 when piston 29 is moved to the right.

Figure 1 shows two engines which are not alike in characteristics. Thus, engine 1 tends normally to run at a lower speed than engine 2 with an equal throttle opening. The effect of this tendency of engine 1 will presently be apparent.

The synchronizing action of the device shown in Figure 1 will now be described. Assume that hand throttle lever 3 is in any given position as for example in the position shown in Figure 1 and assume that engine 2 is running faster than engine 1. Shaft 11 will be driven correspondingly faster than shaft 7. Shaft 14 will likewise be driven faster than shaft 10 and in the opposite direction. Accordingly due to the difference in speed in bevel gears 17 and 16, ring gear 20 will be rotated slowly in the same direction as bevel gear 17 and shaft 14. The speed of rotation of ring gear 20 will depend upon and will be directly proportional to the difference in the speeds of shafts 14 and 10. Rotation of ring gear 20 causes corresponding rotation of pump shaft 22 which causes liquid to be pumped from cylinder 6 through conduits 26 and 25 into liquid chamber 33 of cylinder 5. Since the position of rod 27 and of piston 29 is fixed by the setting of throttle controlling lever 3 the action of pump 4 in pumping liquid into the liquid chamber 33 of cylinder 5 will force cylinder 5 to the right carrying with it throttle rod 23 and opening the throttle of engine 1 and will suck cylinder 6 to the right carrying with it throttle rod 24 and closing the throttle of engine 2. Thus, engine 1 will be speeded up and engine 2 will be slowed down until shafts 10 and 14 revolve at the same speed under which condition rotation of ring gear 20 and operation of pump 4 will cease. Should for any reason engine 2 operate at a lower speed than engine 1, shaft 14 will rotate at a correspondingly lower speed than shaft 10 and ring gear 20 will thereupon be rotated in the same direction as shaft 10 causing pump 4 to pump liquid from cylinder 5 into the liquid chamber of cylinder 6 thereby opening the throttle of engine 2 and closing the throttle of engine 1 until equilibrium is once again established.

As liquid is pumped from one cylinder to the other, the engine from whose cylinder liquid is pumped will be slowed down while the engine to whose cylinder liquid is pumped will be speeded up. This dual action results in a very quick regaining of equilibrium after equilibrium has once been disturbed.

It will be apparent that pump 4 is of any suitable type which is adapted to pump liquid with either of its outlets acting as either an inlet or an outlet. Thus, it is a reversible pump and conduit 25, for example, may be said to be an inlet conduit as well as an outlet conduit and conduit 26 may be similarly designated.

Referring now to Figure 3; 36, 37 and 38 represent three engines which are to be operated synchronously. The throttles of these engines are designated as 39, 40 and 41 respectively. Reference numeral 42 designates an electric motor which is adapted to be driven by battery 43. Motor 42 is of the variable speed type and its speed may be varied within suitable operating limits by means of rheostat 44. It is to be understood that motor 42 may be of any variable speed type and that control of the speed of motor 42 may be attained in any manner. As illustrated, rheostat 44 would be placed in the pilot's cockpit and would be used by the pilot to control the speeds of the engines. By increasing the resistance of rheostat 44 the speed of electric motor 42 would be decreased and correspondingly, by decreasing the resistance of rheostat 44 the speed of motor 42 would be increased.

Electric motor 42 drives a liquid pump 45. Liquid pump 45 pumps liquid from tank 46 through inlet conduit 47 and outlet conduit 48 through the several hydraulic motors 49, 50 and 51. From hydraulic motor 51 a conduit 52 leads the liquid pumped through the circuit to tank 46.

Hydraulic motors 49, 50 and 51 are of any suitable type which will operate accurately and synchronously when liquid is passed therethrough at a given rate. These motors may be, for example, similar to or the same as meter devices employed for measuring liquid in liquid dispensing devices such as gasoline pumps. By virtue of their being connected in series each of these motors receives the same amount of liquid in a given amount of time and by virtue of the accuracy with which motors 49, 50 and 51 are constructed, their shafts 53, 54, and 55 rotate at exactly the same synchronous speed.

Engine 36 drives, by any suitable power takeoff device, a shaft 56 in a direction opposite to that in which shaft 53 is driven. Interposed between shafts 56 and 53 is a differential device designated generally as 57. This differential device may comprise bevel gears or friction discs. Differential 57 is constructed in the usual manner of a differential and operates in such a way that if shaft 56 rotates more slowly than shaft 53, ring gear 58 will be positively driven in the direction of shaft 53 and at a speed corresponding to the difference in speeds between shafts 56 and 53. Rotation of ring gear 58 in the same direction as shaft 53 will cause corresponding rotation of pinion 59 which is drivingly connected with worm 60 and will cause the opening of throttle 39 on engine 36 until engine 36 drives shaft 56 at the same speed as shaft 53 when equilibrium will be established.

Should the pilot slow up motor 42, shaft 53 would be correspondingly slowed up and ring gear 58 would rotate in the same direction as shaft 56 and at a speed corresponding to the difference in speeds between shafts 53 and 56, revolving worm 60 in such manner as to close throttle 39 to such an extent as to cause engine 36 to slow down until shaft 56 is running at the same speed as shaft 53.

Engine 37 is provided with a similar driven shaft 61, differential device indicated generally as 62, ring gear 63, pinion 64 and worm 65. The mechanism interposed between engine 37 and hydraulic motor 50 operates in the same manner as that described in connection with engine 36. Engine 38 is similarly provided with a driven shaft 66, with a differential designated generally as 67 interposed between shafts 66 and 55, with a ring gear 68, with a pinion 69 and with worm 70, all of which operate in the same manner as for the corresponding mechanism employed in connection with engines 36 and 37.

It is to be understood that worm 60 is connected with the throttle rod of throttle 39 in such a manner that upward or downward movement of collar 71 which engages with worm 60 causes pivoting of the throttle rod of throttle 39 about fixed pivot 72 and that upward movement of collar 71 causes a closing of the throttle on engine 36 while downward movement of collar 71 causes an opening of the throttle of engine 36. It will be apparent that connecting rod 74 which connects collar 71 with the throttle rod of throttle 39 is pivoted at 73 and 75 so as to be freely rotatable with respect to collar 71 and the throttle rod of throttle 39. The construction of the throttle controlling mechanism employed on engines 37 and 38 is similar.

In operation the device of Figure 3 functions as follows:

Assume that the engines are idling and that the pilot wishes to bring them up to speed. He will increase the speed of electric motor 42 by manipulating control 44. The increase in speed of motor 42 will cause a similar increase in speed of pump 45. This will cause liquid to be pumped through the circuit at a correspondingly increased speed. Hydraulic motors 49, 50 and 51 will correspondingly and simultaneously increase in speed and shafts 53, 54 and 55 will likewise be driven at a higher speed and in synchronous relationship. Ring gears 58, 63 and 68 will thereupon be caused to rotate in the same direction as shafts 53, 54 and 55 and at a speed corresponding to the difference in speeds between shafts 53, 54 and 55 and shafts 56, 61 and 66 respectively. Pinions 59, 64 and 69 will then be operated so as to open throttles 39, 40 and 41 until engines 36, 37 and 38 have so increased in speed as to cause shafts 56, 61 and 66 to rotate at the same speeds as shafts 53, 54 and 55 respectively.

If for any reason any particular engine tends normally to require a higher throttle opening than the remaining engines in order to develop the same speed of rotation the shaft driven by it and the hydraulic motor shaft corresponding to it will operate the differential mechanism in such manner as to set the throttle of that engine so as to operate it in perfect synchronism with the remaining engines.

Any number of engines may be synchronized perfectly by means of the invention portrayed in Figure 3. If more than three engines are to be synchronized each additional engine is provided with a hydraulic motor, with a driven shaft and with a differential device which controls its throttle, and the hydraulic motor or motors of the additional engine or engines are connected in series with the hydraulic motors portrayed in Figure 3.

The device portrayed in Figure 3 is unique in that the synchronizing means opens the throttles of all of the engines simultaneously and that the control placed in the pilot's cockpit does not directly open the throttle of any of the engines of the airplane.

While Figure 1 shows the use of bevel gears and Figure 3 shows the use of friction gears in the differential mechanism, it is to be understood that if desired, friction discs may be employed in the differential of Figure 1 and bevel gears may be employed in the differentials of Figure 3. It is to be understood that where a liquid is mentioned in this specification, any suitable non-compressible liquid such as oil or the like may be employed as the hydraulic conducting medium.

It is also to be understood that engines 1 and 2 of Figure 1 may be connected to differential 15 by means of flexible shafts. The use of such flexible shafts will facilitate location of the differential 15 and pump 4 in the pilot's cockpit or in the main body of the aircraft as where engines 1 and 2 are located outwardly of the main body of the aircraft, as for example, in the wings thereof.

If desired the electric motor 42 of Figure 3 may be replaced with a manually controlled prime mover such as one of the engines of the airplane. In this way such a manually controlled engine would be a master engine and its speed would control the speed of the remaining engines by reason of pump 45 and the hydraulic motors disposed in series therewith. It will be understood that in using such a system of synchronization any number of subsidiary engines may be operated synchronously with each other and with such a master engine.

It will be seen that by means of the invention described above, it is possible to accurately synchronize a plurality of airplane engines by means which are simple in construction and which result in absolute synchronization of the several engines throughout their speed range. It is to be understood that we intend to comprehend as within our invention such modifications as are necessary to adapt the same to varying conditions and uses.

Having thus fully described our invention, what we claim as new and desire to secure by Letters Patent, is:

1. In a mechanism for synchronizing multiple prime movers, a variable speed motor driving a liquid pump, hydraulic motors for each of said prime movers and arranged in series with said liquid pump, a shaft driven by each of said prime movers at a speed in proportion to the speed of said prime mover, differential means disposed between said pump and said shaft, one side of which is driven by said shaft and the other side of which is driven by said hydraulic motor, and mechanical means operable by said differential means and positively connecting the latter with the respective prime mover for controlling the speed of each of said prime movers.

2. In a mechanism for synchronizing multiple prime movers, a liquid pump, a plurality of hydraulic motors in series therewith, there being a hydraulic motor for each prime mover, differential means associated with each of said prime movers and operable by the difference in relative speeds of said prime movers and said hydraulic motors, and mechanical connecting means positively connecting a speed control member of each of said prime movers with the respective differential means for governing the speed of each of said prime movers.

3. In a mechanism for synchronizing multiple prime movers, an electric motor, the control of the speed of said prime movers being obtained indirectly by the control of the speed of said electric motor, a liquid pump driven by said electric motor, a hydraulic motor associated with each of said prime movers, a shaft driven by each of said prime movers, a differential interposed between said shaft and the shaft of each of said hydraulic motors, and mechanical means operable by the difference in speed between said shaft driven by said prime mover and said hydraulic motor and positively connecting said differential with a speed controlling member of the respective prime mover to govern the speed of said prime mover.

4. In a mechanism for synchronizing multiple prime movers, a variable speed electric motor, a liquid pump driven thereby, a hydraulic motor in association with each of said prime movers and arranged in series with each other and with said pump, a differential interposed between each of said prime movers and each of said hydraulic motors, one side of said differential being driven by each of said prime movers and the other side of each of said differentials being driven by said hydraulic motors, and means driven by each of said differentials and positively connected with the respective differential for varying the speed of each of said prime movers.

5. In a mechanism for synchronizing a plurality of prime movers, a hydraulic pump, manually speed-controlled means for driving said pump, a plurality of hydraulic motors in series with said pump and driven thereby, a plurality of differential means, each of which is driven by one of said motors and one of the prime movers to be synchronized, and mechanical means directly operated by said differential means and positively connected with a speed control member of the respective prime mover for controlling the speed of the prime mover with which it is associated.

6. In a mechanism for synchronizing a plurality of prime movers, a hydraulic pump, means for driving said pump at a desired speed, a shaft driven by one of the prime movers to be synchronized at a speed proportionate to the speed thereof, a hydraulic motor driven by said pump, a shaft driven by said hydraulic motor and at a speed proportionate to the speed of said pump, differential means operable by the difference in speeds of said shafts, a gear associated with each prime mover and meshing with said differential means, and mechanical means positively connecting said gear with a speed control member of the respective prime mover for controlling the speed of the prime mover with which it is associated.

7. In a mechanism for synchronizing a plurality of internal combustion engines each having an adjustable control member for varying the fuel intake, a hydraulic pump, means for driving said pump at a desired speed, a plurality of hydraulic motors in series with said pump and driven thereby, a plurality of differentials, each of said differentials being driven by one of said motors and one of said engines to be synchronized, a gear associated with each engine and meshing with the differential pertaining thereto, and mechanical means positively connecting said gear with the respective control member for controlling the speed of said engine with which it is associated.

DAVID E. BENCH.
MELVIN A. CROSBY.